United States Patent [19]

Nelson

[11] 4,004,867
[45] * Jan. 25, 1977

[54] HIGH VOLTAGE CABLE SPLICE APPARATUS

[75] Inventor: Arthur L. Nelson, La Jolla, Calif.

[73] Assignee: Hexcel Corporation, Dublin, Calif.

[ * ] Notice: The portion of the term of this patent subsequent to Apr. 29, 1992, has been disclaimed.

[22] Filed: Feb. 25, 1975

[21] Appl. No.: 552,903

[52] U.S. Cl. .................. 425/11; 425/108; 425/243; 425/451.9; 425/802; 425/812

[51] Int. Cl.² .................. B29H 5/16; B29C 27/00

[58] Field of Search ............. 425/129 R, 247, 155, 425/130, 282, 284, 802, 812, 11, 108; 249/90, 95, 160, 163, 165, 172, 141; 264/329, 261, 263, 272, 275, 277, 265; 141/286–289

[56] References Cited

UNITED STATES PATENTS

| | | | |
|---|---|---|---|
| 1,990,926 | 2/1935 | Bergmann | 141/286 |
| 2,716,623 | 8/1955 | Tator | 249/95 |
| 3,310,842 | 3/1967 | Fischbach | 425/247 |
| 3,436,446 | 4/1969 | Angell, Jr. | 425/4 |
| 3,496,609 | 2/1970 | Ferguson | 425/144 |
| 3,880,557 | 3/1975 | Nelson | 425/108 |
| 3,889,919 | 6/1975 | Landney | 249/141 |

Primary Examiner—Robert L. Spicer, Jr.
Attorney, Agent, or Firm—Townsend and Townsend

[57] ABSTRACT

Apparatus for molding insulation about a relatively short section of an uninsulated conductor of a high voltage cable. The apparatus has a pair of mold forms that define a cavity in which the new insulation is molded. Heat and pressure applying platens on each side of the mold forms are fitted with perpendicularly extending stress bars and removable means mounted to the platen for biasing the latter and, therewith, the mold forms towards each other. The mold forms and at least one platen include a series of cavity vent holes which are tapered and have a major diameter proximate the cavity. A transfer pot is provided for injecting a softened insulating material into the cavity via a passage. One or more transverse bars extend across the center of the passage and prevent entrapped gas or air disposed in the center of the transfer pot from being transferred into cavity. A band heater is applied about a length of cable contiguous with and extending from the mold forms to avoid the formation of permanent bulges in existing cable insulation during the application of heat and pressure to the new insulating material in the mold form cavity.

11 Claims, 7 Drawing Figures

FIG_1
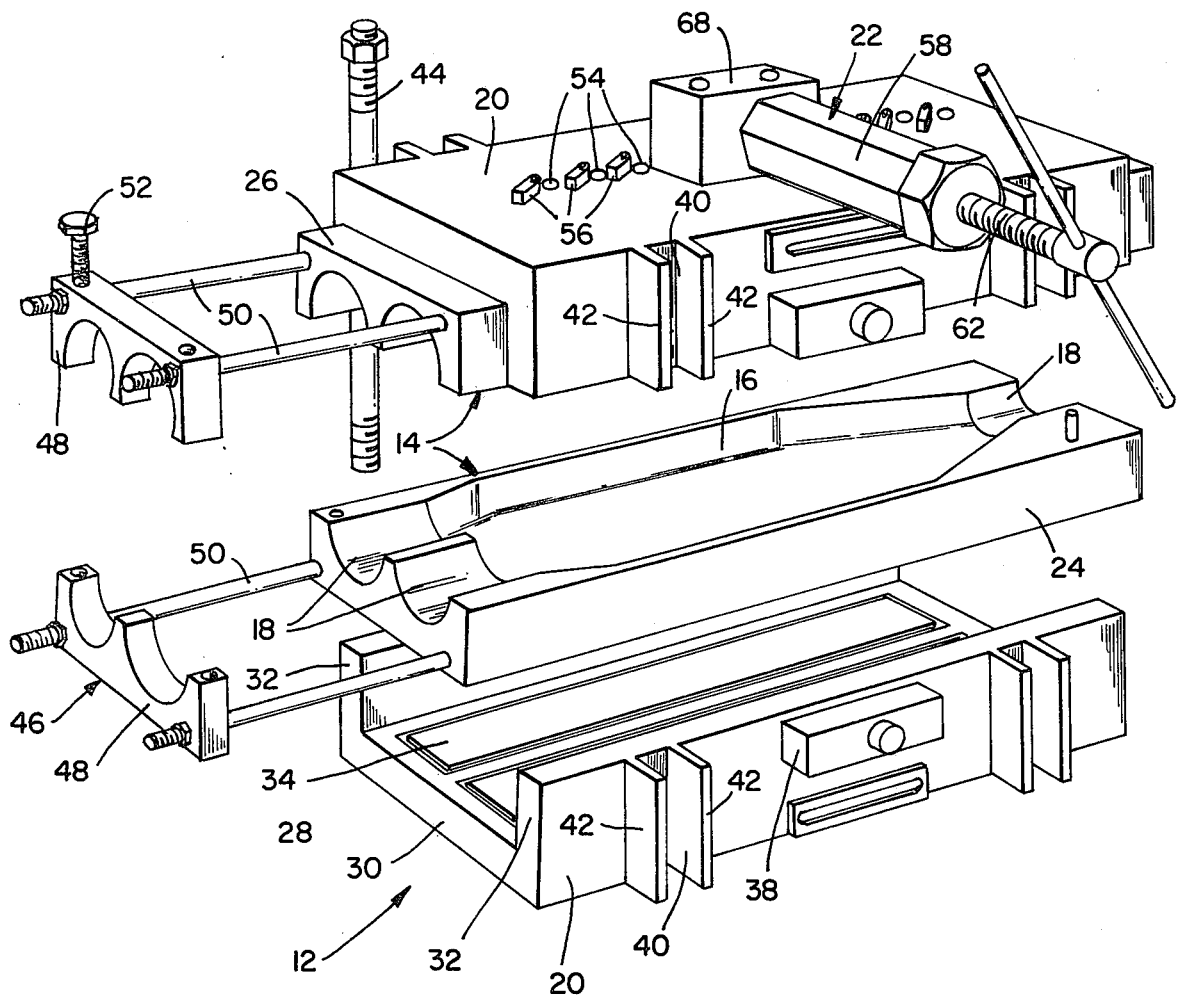
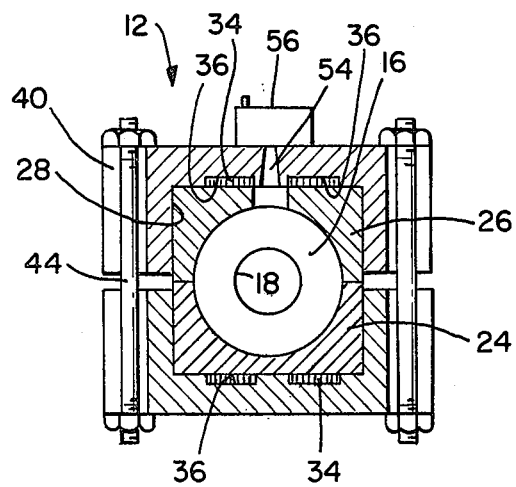
FIG_2
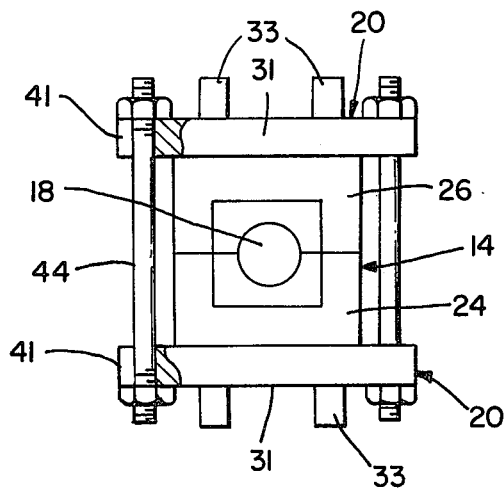
FIG_3

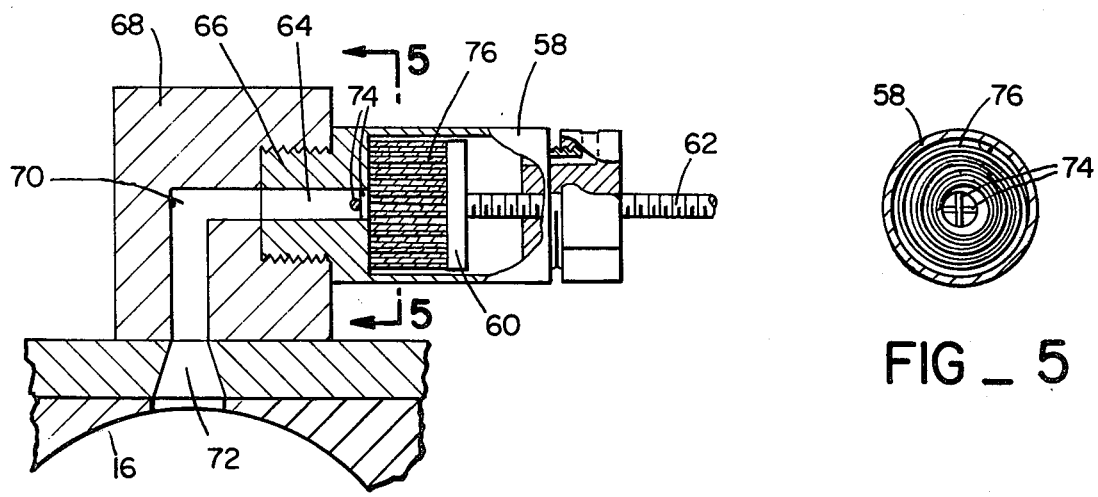
FIG_4
FIG_5
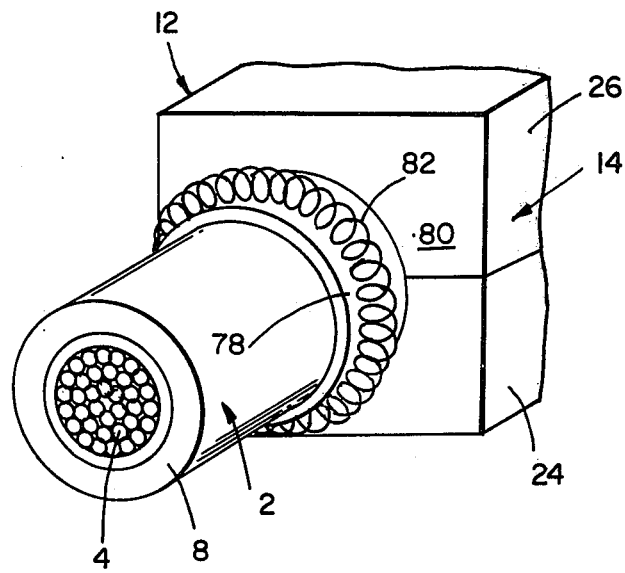
FIG_6
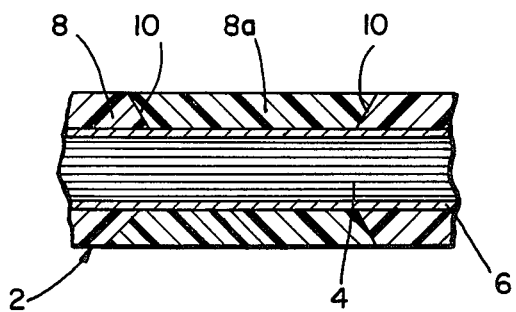
FIG_7

HIGH VOLTAGE CABLE SPLICE APPARATUS

BACKGROUND OF THE INVENTION

The present invention relates to apparatus for forming fresh insulation, hereinafter sometimes referred to as an "insulation splice" about a relatively short section of an uninsulated conductor of a high voltage cable.

Such insulation forming devices are presently in use for repairing damaged cable insulation or for forming new insulation about a cable splice, for example. For high voltage cable such insulation may be of a thickness of as much as one-half inch or more. The insulation splice must be homogenous within itself, that is, it must be free of discontinuities and it must further be homogeneously bonded to existing cable insulation to prevent the formation of electrical interfaces which may lead to corona discharges and a premature failure of the insulation splice.

In the prior art it was initially common to form such insulation splices manually. The task required skillful operators, was time-consuming and therefore expensive, and further frequently yielded unreliable insulation splices. This inventor has previously invented apparatus for reliably and reproducibly forming high quality, high voltage cable insulation splices. One such device is described, for example, in co-pending patent application Ser. No. 344,103, filed Feb. 20, 1973, now U.S. Pat. No. 3,880,557, entitled MOLDING METHOD FOR SPLICING ELECTRICAL CABLE. The device described in that co-pending patent application broadly comprises a pair of mold forms which define therebetween a cavity within which the insulation splice is formed and cured. Hingeably interconnected pressure platens are provided for heating the mold halves and pressing them together during forming and curing of the insulation. This device has found great commercial acceptance and is ideally suited for many industrial applications.

The need for the increasingly larger pressures, particularly when forming polyethylene insulation splices, together with requirements of making splices in areas having limited accessibility, such as municipal high voltage cable racks has rendered the device disclosed in the referenced patent application at times difficult to use.

SUMMARY OF THE INVENTION

Accordingly, the present invention provides certain improvements to prior art insulation splicing devices which render such devices more universally applicable. The improvements relate both to the overall size of the device, its strength, the required space for operating device and the operating characteristics to assure optimal, high quality and reproducible high voltage insulations splices irrespective of the insulation material employed and/or the location at which the splice must be made.

According to one aspect of the invention the apparatus has two mold halves which define therebetween a cavity into which the uninsulated cable section is placed and an opening through which an insulated remainder of the cable extends to the exterior. First and second heat and pressure applying members are provided on each side of the mold halves and include heating means for heating the mold. The members have generally flat plate portions and each plate portion includes at least one stress bar protruding perpendicular from the plate for strengthening it. Pressure applying members define a plurality of pairs of opened, aligned recesses into which means such as threaded bolts means are removably placed for pressing the pressure and heat applying members towards each other to thereby firmly close the mold. Means is further provided for introducing into the cavity insulating material for forming the insulation about the uninsulated section of the conductor.

The provision of removable bolts eliminates heretofore encountered weaknesses in the connection between the pressure platens when they are biased together. Furthermore, the provision of stress bars, alone and in combination with the removable bolts, permits the exertion of a sufficient interior cavity pressure, without undue deflections which may compromise the quality of the spliced insulation, so that materials such as polyethylene can be used as the splice material. In the past, it was generally considered that polyethylene insulation splices could not be reliably formed because of the necessary high cavity pressure. Amongst other problems the high pressure made it difficult to maintain the mold forms aligned without rendering the device so heavy as to make it unattractive for manual use in the field.

The mold of the present invention includes a plurality of vent holes that extend from the cavity through the mold halves to the exterior for venting entrapped gas and insulating material to the atmosphere. The vent holes are tapered over at least a portion of their length and have a major diameter proximate the cavity. Upon removal of the finish formed insulation splice the relatively large diameter of the plugs in the vent holes prevents the plugs from breaking off. In the past, such breakage could occur because the vent holes, particularly at the exterior had to be of a relatively small diameter to allow for the closure and sealing thereof. Once the plug broke off it was difficult to remove it from the vent hole and, more importantly, it frequently left indentations on the exterior of the just formed insulation splice. Such indentations constitute discontinuities which had to be eliminated by filling the holes and/or by time-consumingly sanding the exterior of the insulation until it was smooth.

Another aspect of the present invention provides means for storing a quantity of fluidized insulating material and for transferring such material to the cavity through a passage communicating the storing means with the cavity. Means is provided for blocking a fluid flow through a center portion of at least part of the passage length and dividing such flow into a plurality of individual flows to prevent or at least substantially reduce the transfer of air and gas entrapped in the insulating material.

In a preferred embodiment of the invention the storing means comprises a piston disposed in a container in which insulating material in the form of spirally wound bands (which normally include center air pockets) is placed. After the material has been heated and softened, actuation of the piston forces the material through the passage into a cavity. Perpendicular crossbars extend diametrically across the passage. They break the flow of the insulation material, and any air entrapped therein into a plurality, e.g., four individual flows. This permits a substantial portion of the entrapped air to migrate through a gap between the piston and the container to the exterior. The transfer of entrapped air and gas from the container to the cavity is thereby greatly reduced.

A further problem encountered in the past when forming insulation splices on high voltage cables, particularly cables having a polyethylene insulation, is the formation of bulges in the original insulation immediately adjacent the ends of the splice mold. Such bulges are formed because the insulation immediately adjacent but exterior of the molds heats sufficiently to soften. When heat and pressure are applied to the cavity the pressure, together with the heat expansion of the existing insulation cause a slow flow of softened polyethylene insulation from the cavity to the exterior thereof. When the mold is cooled after the insulation splice has been cured the portion of the insulation immediately outside the mold cools first and hardens so that it is not drawn back into the mold as the insulation contracts. A permanent insulation bulge remains.

To avoid this problem the present invention contemplates the use of band heaters applied to the portion of the existing cable insulation just outside the mold which retain such insulation at a sufficient temperature while the mold cools that the bulge insulating material is drawn back into the mold as the cable within the mold cools and contracts. Thus, after complete cooling the cable has a continuous, bulge-free exterior. Discontinuity problems and possible premature cable failures due to such bulges, as encountered in the past, are thereby eliminated.

Other aspects of the invention include the provision of independent pressure platens, as distinguished to the heretofore common hingebly interconnected pressure platens and a mounting of the transfer pot for the insulation material in a horizontal inclination to minimize the height required for forming a splice. Such a mold preferably includes U-shaped heating platens which securely position the mold forms, which maximize the heat transfer area between the platens and the mold forms, and which have great strength so that they are readily used for making polyethylene splices. Yet, such a high-strength mold for cable diameters of up to 3 to 4 inches requires an operating height of no more than about 10 inches. It is thus possible to use the mold for forming splices on cables disposed in standard municipal high-voltage underground cable racks without removing the cable from the rack.

From the foregoing it will be apparent that the present invention provides significant improvements to prior art high voltage cable splice apparatus which enhance the utility of such apparatus, and which reduce its operating costs and the skill required of the operator. It thus facilitates the formation of otherwise difficult to form, homogenous high voltage cable insulation splices.

BRIEF DESCRIPTION OF THE DRAWINGS

FIG. 1 is an exploded perspective view of an apparatus for forming an insulation splice constructed in accordance with the present invention;

FIG. 2 is a cross-sectional view of the apparatus shown in FIG. 1 and shows the apparatus in its closed state;

FIG. 3 is a view similar to FIG. 2 but shows another embodiment of the invention;

FIG. 4 is a fragmentary cross-sectional view of a transfer pot constructed in accordance with the present invention;

FIG. 5 is a plan view, in section, taken along lines 5—5 of FIG. 4;

FIG. 6 is a fragmentary, perspective end view of a mold constructed in accordance with the present invention and fitted with band heaters to prevent the formation of permanent insulation bulges; and FIG. 7 is a cross-sectional view through a portion of a high voltage cable including a short length of conductor provided with a newly applied insulation splice.

DESCRIPTION OF THE PREFERRED EMBODIMENTS

Referring first to FIG. 7, a high voltage electrical cable 2 is schematically illustrated as having a core 4 which defines the electrical conductor of the cable and which is surrounded by a first or inner semi-conductor layer 6. An insulation 8, such as polyethyelene or ethylene propylene rubber (EPR) surrounds the semi-conductor layer. The finished cable further includes on the exterior of the insulation 8 a second semi-conductive layer (not shown in FIG. 7), an electrically conductive shield (not shown in FIG. 7) surrounding the second semi-conductor, and finally an electrically insulating layer or jacket (not shown in FIG. 7) which forms the exterior of the finished cable. Since the present invention relates to the formation of splices on insulation layer 8, the outer layers are not shown to simplify the drawings and the description.

When the cable 2 is manufactured, core 4 including the first semi-conductor 6 receives a continuous, annular insulation layer 8 which is formed with a variety of known apparatus. From time to time a short section of insulation layer 8 is removed, either because the insulation is defective or because two conductor ends had to be joined, e.g., welded together. The present invention is concerned with applying a relatively short length of insulation or an insulation splice 8a about the resulting uninsulated core section. Before the new insulation is applied the ends of the existing insulation 8 adjoining the splice 8a are "penciled", that is the ends are tapered to form conical surfaces 10.

The material from which splice 8a is formed is normally chosen according to the material of which the existing cable insulation 8 is made as well as the available insulation molding apparatus. In many high voltage applications existing insulation comprises cured, heat softenable polyethylene. For such applications the insulation splice 8a may, for example, be EPR or, if suitable high pressure equipment is provided, polyethylene. Other materials can be substituted so long as they soften when subjected to heat so that the insulation can be injected into a cavity surrounding the outer insulated core section as described below.

Referring now to FIGS. 1, 2 and 7, an apparatus 12 constructed in accordance with the present invention for molding an insulation splice about a relatively short, uninsulated section of a conductor of high voltage cable generally comprises a mold 14 defining a mold cavity 16 which communicates with the exterior through a plurality of openings 18; heat and pressure applying members 20, means such as transfer pot 22 for injecting insulating material into the cavity, and means such as bolts 44 for biasing the members 20 towards each other and thereby against mold 14. The mold is constructed of a pair of opposite mold halves or forms 24, 26 and to form an insulation splice, a cable, as described above and shown in FIG. 7, is placed into the mold so that the uninsulated conductor is disposed within mold cavity 16 while a remainder of the insulated cable extends through mold openings 18 to the exterior. The embodiment of the invention shown in FIG. 1 illustrates a mold for forming a Y-splice, that is for branching a single conductor into a pair of parallel conductors. Accordingly, the cavity is laterally oblong and has one opening on one end thereof while the other end of the cavity communicates with the exterior through two openings to accommodate the three high voltage conductors branching from a Y-splice. A single conductor, normally cylindrical cavity for concentrically applying an insulation layer about one continuous conductor (as shown in FIG. 7 for example) can of course be substituted.

The exterior of mold halves 24, 26 has a rectangular configuration and is snugly received within a generally U-shaped interior surface 28 of members 20. The members have a U-shaped configuration defined by flat platens 30 and pairs of spaced apart, perpendicular legs 32 which face each other. Flat heating elements 34 are disposed in recesses 36 of platen 30 and heat the mold to the desired temperature. Temperature control means 38 may be provided to adjust the ultimate mold temperature.

A plurality of elongate recesses 40 defined by spaced apart ribs 42 protruding perpendicularly from outer surfaces of legs 32 define a plurality of aligned slots into which means for tightening the molds to each other, such as threaded bolts 44, are placed. The number and spacing of the recesses are selected to prevent significant deflection of pressure platen 30 when the mold cavity 16 is subjected to its operating pressure. It will be observed that upon loosening of the nuts, bolts 44 can be freely removed for disassembly (and assembly) of the molding device 12 without the need for hingeably opening one or both pressure applying members and the corresponding mold forms. In this manner the required operating height for the device is greatly reduced as compared to prior enable the use of the mold of the present invention in areas having limited available height. The threaded bolts can be replaced with other types of fasteners such as clamps, quick-release jacks (not shown in drawings) etc.

During the actual molding step when bolts 44 tightly secure the molds to each other, the cables protrudes from cavity openings 18. When pressure is applied to the mold cavity 16 during heating and curing of insulation splice 8a and a Y-splice is formed a greater axial pressure acts on the two cable strands protruding from the mold than on the one strand protruding from the other mold end. The pressure differential can be sufficiently large to cause the cable to move or "walk" in the direction of the two cable strands. To prevent such walking a clamp 46 is provide comprising two opposite clamp segments 48 which are fastened to the end face of the respective mold halves 24, 26 by elongate tie rods 50. The outer ends of the tie rods are threaded for adjusting the spacing between the clamp segments and the molds. During the molding step the clamp segments are secured together with threaded bolts 52 to firmly grip the two cable strands and prevent their "walking".

Referring briefly to FIGS. 1 and 3, in an alternative embodiment of the invention, pressure members 20 are defined by flat platens 31 fitted with pairs of stress bars 33 which depend from the side of the platens facing away from mold 14. Instead of providing ribs 42 (as shown in FIGS. 1 and 2) platen 31 includes open slits 41 which removably receive threaded tightening bolts 44 for clamping the pressure platens and, therewith the mold halves, together. In all other respects the embodiment of the invention illustrated in FIG. 3 corresponds to that illustrated in FIG. 2. This embodiment also permits the sideway removal of the threaded bolts for handling the molding apparatus in areas having a limited access height.

Referring again to FIGS. 1, 2 and 7, after the cable has been placed in mold 14 and the mold has been tightly closed with bolts 44, it is heated and insulating materials is injected into cavity 16 from transfer pot 22. As material is injected, air in the cavity must be permitted to vent to the exterior to assure that the cavity will be completely filled with insulating material and to thereby prevent the formation of discontinuities which can render the insulation splice fatally defective. It is known to provide a plurality of vent holes 54 which communicate from the cavity through the upper mold half 26 and the associated platen 30 to the exterior. It is further known to provide pivotally mounted closure members 56 on the exterior of platen 30 which can be moved over the respective vent holes to close or open them. In this manner air and insulating material can be vented, the progress of the insulating material as it is injected into the cavity can be monitored, and pressure can be selectively built up in parts of the cavity during the formation of the insulation splice.

In accordance with the present invention, vent holes 54 are tapered. Their minor diameter is at the outer surface of platen 30 to minimize the forces which act on closure members 56 and to further minimize the area that must be sealed by them to assure trouble-free operation. A major diameter of the tapered hole is adjacent the mold cavity. In the preferred embodiment of the invention the vent holes have a relatively large cylindrical diameter through the mold and are tapered through pressure platen 30. Upon removal of the finish formed insulation splice the danger of breaking the insulation material plugs due to small diameters is thereby greatly reduced or eliminated. The troublesome dislodging of jammed, broken off plugs from the vent holes and/or time-consuming elimination of depressions where the plugs broke off from the main body of the newly formed insulation are eliminated.

Referring now to FIGS. 1, 4 and 5, transfer pot 22 generally comprises a hollow cylindrical container 58 which houses a piston 60 that can be reciprocated by manually turning a threaded bar 62 secured to the piston. The piston has sufficient play to allow gas or air to escape past a gap between the piston and the container wall to the exterior. The inner end of the container includes an interior passage 64 and an exteriorly threaded, reduced diameter connector 66 threaded into a fitting 68 mounted, e.g., bolted to the top surface of platen 30. The fitting has an L-shaped bore that communicates with passage 64 of container 58 and with a vertically extending bore 72 through platen 30 to establish fluid communication between the interior of the container and mold cavity 16. It will be observed that the container lies generally parallel to and is disposed closely adjacent platen 32 to minimize the vertical height requirement for the apparatus.

A pair of perpendicular cross-bars 74 positioned proximate to the inner container end extend diametrically across passage 64. In use a supply of spirally wound insulating material 76 (only partially shown in FIG. 5 to more clearly illustrate the relative positioning of the cross-bars) is placed inside container 58. Upon energization of heating elements 34 heat is conducted to the container and the insulation material is fluidized. When threaded bar 62 is turned to force piston 60 towards the bottom of the container the fluidized insulating material in container 58 is transferred via passage 64 and bores 70, 72 into mold cavity 16. The presence of cross-bars 74 breaks the flow of insulating material and any entrapped air into a plurality (up to four) separate flows which prevents the transfer of air or gas entrapments (which mostly form in the vicinity of the center of the spirally wound tape) to the cavity where they would either form undesirable discontinuities in the insulation splice or from where they have to be vented to the exterior. As above described air separated from the flow escapes through the gap between the piston and the container wall.

The operation of molding device 12 can now be briefly summarized. In preparation for making an insulation splice a supply of insulating material 76 is placed into container 58 of transfer pot 22. Bolts 44 are loosened and removed from recesses 40 and the mold halves 24, 26 are separated. The uninsulated section of the cable is now placed so that it is centered in mold cavity 16, additional insulation material may be placed within the cavity and the mold is tightened with threaded bolts 44. If necessary, cable clamp 46 is applied (for Y-splices only). Heating elements 34 are energized to raise the mold temperature sufficiently high to soften or fluidize the insulation material so that it can be injected into the mold cavity by turning threaded bar 62 of the transfer pot. Initially vent holes 54 are open and they may thereafter be sequentially closed as insulating material appears, such appearance indicating that the air in the region of the cavity underlying the particular vent hole has been evacuated. After the cavity is completely filled with insulating material the transfer pot may be removed for cleaning while the threaded hole in fitting 68 is closed (with a pipe plug for example). The mold temperature is maintained at the desired curing temperature, for example at about 375° F for curing EPR or crosslinked polyethylene, and thereafter the mold is permitted to cool down. After it has reached room temperature the mold is opened and the cable is removed from the mold and the second semi-conductor layer, the shield and the outer jacket can be applied to the splice.

While and insulation splice is molded and cured, portions of the cable in mold openings 18 and immediately adjacent but exterior thereof heat up which may soften the existing cable insulation. The elevated temperature of the mold causes an expansion of the existing insulation material and a resulting migration of some insulation material to the mold exterior where it forms bulges immediately adjacent the mold. This phenomenon is further aided by the pressures in the mold cavity. As such insulation material migrates to the exterior it cools and hardens so that upon cooling of the mold, and a corresponding contraction of the cable insulation, the previously migrated material does not return, leaving permanent insulation bulges which form discontinuities in the insulation and which can detrimentally affect the life of the cable.

Referring to FIG. 6, to prevent the formation of such bulges the present invention provides elongate, flexible band heaters 78 which are applied about short lengths of cable contiguous with end faces 80 of mold 14. An annular coil spring 82 is placed about the band heater and its ends are secured to each other so that the spring resiliently biases the band heater into intimate contact with the cable. The band heater heats the underlying cable insulation to a sufficiently high temperature to maintain it soft of fluid. When the existing insulation contracts during cooling of the mold the previously formed insulation bulges on the exterior of the mold is pulled back since the insulation underlaying the band heaters is kept at an elevated temperature. In this manner, the formation of permanent insulation bulges is prevented. For most applications band width of between one to three inches are sufficient to avoid the formation of any permanent insulation bulges.

I claims:

1. In apparatus for forming insulation about an uninsulated section of a conductor of a high voltage cable and having a mold defined by opposing mold halves which form a mold cavity therebetween into which the uninsulated conductor section is placed; a pressure platen in contact with each mold half; means for biasing the pressure platens against each other to thereby firmly close the mold; means for heating the mold; and means for introducing into the cavity a heat softenable and curable insulating material; the improvement comprising: a plurality of vent holes extending from the cavity through the mold to the exterior for venting to the atmosphere entrapped gas and insulating material, the vent holes being tapered over at least a portion of their length and having a major diameter proximate the cavity to prevent hardened insulating material disposed in such vent holes from breaking from the newly formed insulation when the cable is removed from the mold.

2. Apparatus according to claim 1 wherein the vent holes extend through one of the mold halves and one of the pressure platens.

3. Apparatus according to claim 2 wherein the portion of the vent hole in the pressure platen is tapered.

4. Apparatus according to claim 3 wherein the portion of the vent hole disposed in the mold half has a cylindrical configuration and a diameter greater than the major diameter in the tapered portion in the pressure platen.

5. In apparatus for molding insulation about a relatively short section of an uninsulated conductor of a high voltage cable and having a mold defining a cavity and an opening communicating the cavity with the exterior for placement of the uninsulated section in the cavity while an insulated remainder of the cable extends through the opening to the exterior; means for introducing into the cavity a heat curable insulating material, and first heating means for heating the mold to cure the insulating material introduced into the cavity; the improvement comprising; second heating means for heating a length of insulated cable contiguous with and exterior of the mold to a sufficient temperature to soften the cable insulation over such length so that heat and pressure generated in the cavity are prevented from forming a permanent insulation bulge at said length.

6. Apparatus according to claim 5 wherein the second heating means comprises an annular heater.

7. Apparatus according to claim 6 wherein the annular heater is defined by an elongate band heater placed around said cable length, and means for biasing the band heater into intimate contact with the cable length.

8. Apparatus according to claim 7 wherein the biasing means comprises a releasable annular compression spring disposed about an exterior of the band heater.

9. Apparatus for molding insulation about a relatively short, uninsulated section of a conductor of a high voltage cable comprising:
- a mold defined by a pair of opposite mold forms defining therebetween a cavity and an opening for positioning the section within the cavity while a remainder of the cable extends through the opening to the exterior;
- first and second pressure applying members positioning the mold therebetween;
- means for biasing the pressure applying members towards each other to thereby securely close the mold;
- the mold and at least one of the members defining a plurality of vent holes extending from the cavity through the mold to the exterior for venting to the atmosphere entrapped gas and insulating material, the vent holes being tapered over at least a portion of their length and having a major diameter proximate the cavity;
- means for storing a quantity of fluidized insulating material and for transferring such material to the cavity through a passage communicating the storing means with the cavity, and means separating the fluid flow immediately adjacent the storing means into a plurality of individual flows over at least part of the passage length; and
- first heating means for heating the mold and the insulating material in the storage means to a sufficient temperature to fluidize it for injection into the cavity and to cure the insulation material in the cavity.

10. Apparatus according to claim 9 including second heating means for heating a length of insulated cable contiguous with and exterior of the mold to a sufficient temperature to soften the cable insulation over such length so that heat and pressure generated in the cavity are prevented from forming a permanent insulation bulge at said length.

11. Apparatus for forming insulation about an uninsulated section of a high voltage conductor comprising in combination: a mold defined by first and second opposite mold forms which form a mold cavity therebetween when brought into mutual contact for receiving the uninsulated high voltage conductor section therein; a pressure platen for each of the mold forms and positioned for contacting a surface of each mold form facing away from the other mold form; means for biasing the pressure platens against each other to thereby close the mold and bias the mold forms against each other; means for heating the mold; means for introducing into the mold cavity a heat softenable and curable insulating material; the first mold form and the associated pressure platen including a plurality of vent holes extending from the cavity through the mold form and through the pressure platen to the exterior for venting to the atmosphere entrapped gas and insulating material, a portion of the vent holes disposed in the first mold form having a generally cylindrical configuration and a relatively large diameter, another portion of the vent hole disposed in the pressure platen having a longitudinally tapered configuration with a major diameter disposed proximate the first mold form and a minor diameter remote from the first mold form.

* * * * *